United States Patent
Anastasi

(10) Patent No.: US 9,194,132 B2
(45) Date of Patent: *Nov. 24, 2015

(54) ADJUSTABLE BRACKET FOR THE ATTACHMENT OF BUILDING CLADDING SYSTEMS

(71) Applicant: EXO-TEC Manufacturing, Inc., Avon, MA (US)

(72) Inventor: Leonard L. Anastasi, Stoughton, MA (US)

(73) Assignee: EXO-TEC MANUFACTURING, INC., Avon, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,101

(22) Filed: Oct. 27, 2014

(65) Prior Publication Data

US 2015/0052831 A1    Feb. 26, 2015

Related U.S. Application Data

(63) Continuation of application No. 13/480,952, filed on May 25, 2012, now Pat. No. 8,875,467.

(60) Provisional application No. 61/519,556, filed on May 25, 2011.

(51) Int. Cl.
| | |
|---|---|
| *E04B 1/38* | (2006.01) |
| *E04F 13/08* | (2006.01) |
| *E04F 13/12* | (2006.01) |
| *E04B 1/98* | (2006.01) |
| *E04B 2/02* | (2006.01) |
| *F16B 5/02* | (2006.01) |

(52) U.S. Cl.
CPC ............... *E04F 13/0816* (2013.01); *E04B 1/98* (2013.01); *E04B 2/02* (2013.01); *E04F 13/0801* (2013.01); *E04F 13/0807* (2013.01); *E04F 13/0853* (2013.01); *E04F 13/12* (2013.01); *F16B 5/0208* (2013.01); *F16B 5/0275* (2013.01); *E04B 2002/028* (2013.01); *E04B 2002/0256* (2013.01)

(58) Field of Classification Search
CPC .............. E04F 13/0816; E04F 13/0801; E04F 13/0807; E04F 13/12; E04F 13/0853; F16B 5/0208; F16B 5/0275; E04B 1/98; E04B 2/02; E04B 2002/028; E04B 2002/0256
USPC ........... 52/698, 704, 705, 706, 712, 713, 714, 52/562, 565, 568, 379, 383
See application file for complete search history.

(56) References Cited

U.S. PATENT DOCUMENTS

| | | |
|---|---|---|
| 3,274,680 A | 9/1966 | Cruise |
| 3,450,427 A | 6/1969 | Fischer |

(Continued)

OTHER PUBLICATIONS

Knight Wall Systems, "DOW™—Knight CI-System™ for Ashrae Compliant Continuous Insulation: R-Valve=Real Value", 6 pages.

*Primary Examiner* — Mark Wendell
(74) *Attorney, Agent, or Firm* — Lando & Anastasi, LLP

(57) ABSTRACT

A device for use in the fastening of a panel or cladding to a wall is disclosed. The device includes a base plate, a panel connecting plate, and a connecting assembly that connects the panel connecting plate to the base plate and that is constructed and arranged so as to provide minimal thermal bridging between the base plate and the panel connecting plate through an insulation layer that covers the base plate and the wall while simultaneously providing structural integrity for attaching the panel or cladding to the wall.

20 Claims, 5 Drawing Sheets

(56) References Cited

U.S. PATENT DOCUMENTS

| | | |
|---|---|---|
| 3,715,850 A | 2/1973 | Chambers |
| 4,009,549 A | 3/1977 | Hala |
| 4,021,989 A | 5/1977 | Hala |
| 4,604,846 A | 8/1986 | Ekstrom |
| 4,825,614 A | 5/1989 | Bennett et al. |
| 5,417,050 A | 5/1995 | Cosentino |
| 6,131,360 A | 10/2000 | Dalen |
| 6,202,375 B1 | 3/2001 | Kleinschmidt |
| 6,588,169 B2 | 7/2003 | Sarver |
| 7,415,803 B2 | 8/2008 | Bronner |
| 7,818,935 B2 | 10/2010 | Velickovic |
| 8,109,706 B2 | 2/2012 | Richards |
| 8,875,467 B2 * | 11/2014 | Anastasi ................ 52/705 |
| 2013/0074432 A1 | 3/2013 | Ciuperca |

* cited by examiner

ADJUSTABLE BRACKET FOR THE ATTACHMENT OF BUILDING CLADDING SYSTEMS

CROSS-REFERENCE TO RELATED APPLICATIONS

This application is a continuation under 35 U.S.C. §120 of U.S. application Ser. No. 13/480,952, now U.S. Pat. No. 8,875,467, entitled "ADJUSTABLE BRACKED FOR THE ATTACHMENT OF BUILDING CLADDING SYSTEMS" filed on May 25, 2012, which claims the benefit of U.S. Provisional Application 61/519,556, entitled "ADJUSTABLE BRACKED FOR THE ATTACHMENT OF BUILDING CLADDING SYSTEMS" filed on May 25, 2011, each of which is herein incorporated by reference in its entirety.

FIELD OF THE INVENTION

The present invention relates generally to devices used in the construction industry to fasten cladding systems to buildings.

BACKGROUND OF THE INVENTION

Recent changes in the International Energy Code require "continuous insulation" in many exterior wall assemblies. These requirements were added in an effort to reduce the amount of thermal bridging that occurs in many assemblies due to these assemblies containing conductive materials that extend from the warm side of the wall to the cold side of the wall. In many assemblies, thermal bridging can reduce the effectiveness of the insulation in the assembly by up to 50% and more depending on the frequency of the bridging.

The present state of the art for attaching many cladding systems to buildings is via the use of what is commonly called "Z-furring" or similar metal devices. These devices are installed in a continuous manner usually in horizontal or vertical orientations and at predetermined spacings. Insulation is then installed between the devices resulting in the devices bridging through the insulation from the warm side of the insulation to the cold side of the insulation in a continuous manner thus reducing the effectiveness of the insulation.

In using the present state of the art devices, adjustability to compensate for construction tolerances, out of plumb framing and out of plane substrates is achieved via the use of shims installed between the device and the substrate. Also the devices provide a means of retaining the insulation installed between the devices in place. This is usually achieved via a retaining element or a friction fit.

The principal objective of the present invention is to provide a new and novel means of fastening cladding systems to buildings in a way that substantially reduces thermal bridging. Another objective of the present invention is to provide adjustability of the fastening system within the device. Another objective of the present invention is to provide a mean of mechanically fastening rigid and semi-rigid insulation in the exterior wall assembly.

SUMMARY OF THE INVENTION

Aspects and embodiments of the present invention are directed to providing a new and novel device for securely fastening cladding systems to back up walls of buildings in a way that substantially reduces thermal bridging. Another aspect of the present invention is to provide adjustability of the plane for fastening of the cladding systems to back up walls of buildings with the device of the present invention. Still another aspect is to provide for securing rigid and semi-rigid insulation to the back up wall with the device of the present invention. A further aspect of the present invention is to provide for varying thickness insulation layers to be secured to the back up wall of buildings with the device of the present invention. Various embodiments and aspects of an adjustable bracket used for the attachment of building cladding systems or panels to building back up walls that substantially minimizes thermal bridging, provide adjustability of the plane for connection such cladding systems, and that provides for securing varying thickness rigid and semi-rigid insulation to the back up wall of the building enclosure assembly are disclosed herein.

In one embodiment, the device comprises a flat base plate that is attached to a first end of a post. This post is inwardly threaded at a second end that is not attached to the base plate. An outwardly threaded post is engaged to the inwardly threaded post at a first end of the outwardly threaded post by the threading of the first end of the outwardly threaded post into the second end of the inwardly threaded post. An additional flat plate is attached to a second end of the outwardly threaded post that is not threaded into the inwardly threaded post.

One embodiment of a device for use in the fastening of a panel or cladding to a back up wall comprises a base plate constructed and arranged to be affixed to the wall, a panel connecting plate constructed and arranged to provide attachment points for fastening of the panel or cladding to the panel connecting plate, and a connecting assembly that connects the panel connecting plate to the base plate and that is constructed and arranged so as to provide minimal thermal bridging between the base plate and the panel connecting plate through an insulation layer that covers the base plate and the wall, while simultaneously providing structural integrity for attaching the panel or cladding to the wall.

One aspect of this embodiment of the device is that the connecting assembly is constructed and arranged to be adjustable in length so as to provide for different first lengths between the base plate and the panel connecting plate so as to compensate for variations in a planar location of the wall. Another aspect of this embodiment of the device is that the connecting assembly can comprise a threaded post connected to the base plate and having a threaded aperture along at least a portion of the threaded post, and a threaded post connected to the panel connecting plate having an threaded outside diameter along at least of a portion of the threaded post that is constructed and arranged to mate with threaded post to provide the adjustable first length. Another aspect of this embodiment of the device is the device can also comprise an insulation retaining plate having a threaded aperture constructed and arranged to mate with the threaded post so as to be disposed between the base plate and the panel connecting plate and constructed and arranged to have its position with respect to the base plate be adjustable so as to provide for a varying second distance between the base plate and the insulation retaining plate to secure the insulation layer between the base plate and the insulation retaining plate.

Another aspect of this embodiment of the device is that the connecting assembly can comprise an insulation retaining plate to be disposed between the base plate and the panel connecting plate and constructed and arranged to have its position with respect to the base plate be adjustable so as to provide for a varying distance between the base plate and the insulation retaining plate so as to secure the insulation layer between the base plate and the insulation retaining plate.

Another embodiment of a device for use in the fastening of a panel or cladding to a back up wall comprises a base plate constructed and arranged to be affixed to the wall, a panel connecting plate constructed and arranged to provide attachment points for fastening of the panel or cladding to the panel connecting plate, a connecting assembly that connects the panel connecting plate to the base plate so as to provide structural integrity for attaching the panel or cladding to the wall, and an insulation retaining plate constructed and arranged to be disposed between the base plate and the panel connecting plate and constructed and arranged to have its position with respect to the base plate be adjustable so as to provide for a varying second distance between the base plate and the insulation retaining plate so as to secure an insulation layer between the base plate and the insulation retaining plate.

One aspect of this embodiment of the device is that the connecting assembly is constructed and arranged to be adjustable in length so as to provide for different first lengths between the base plate and the panel connecting plate so as to compensate for variations in a planar location of the wall.

Another aspect of this embodiment of the device is that the connecting assembly includes a threaded post connected to the base plate and having a threaded aperture along at least a portion of the threaded post, and a threaded post connected to the panel connecting plate having an threaded outside diameter along at least of a portion of the threaded post that is constructed and arranged to mate with threaded post to provide the adjustable first length. Another aspect of this embodiment of the device is that the insulation retaining plate has a threaded aperture constructed and arranged to mate with the threaded post.

Another aspect of this embodiment of the device is that the connecting assembly is constructed and arranged so as to provide minimal thermal bridging between the base plate and the panel connecting plate through the insulation layer.

Another embodiment of a device for use in the fastening of a panel or cladding to a back up wall comprises a base plate constructed and arranged to be affixed to the wall, a panel connecting plate constructed and arranged to provide attachment points for fastening of the panel or cladding to the panel connecting plate, and an adjustable length connecting assembly that connects the panel connecting plate to the base plate and that is constructed and arranged to be adjustable in length so as to adjust a position of the panel connecting plate with respect to the base plate so as to provide for different first lengths between the base plate and the panel connecting plate, the adjustable length connecting assembly further constructed and arranged so as to provide minimal thermal bridging between the base plate and the panel connecting plate through an insulation layer that covers the base plate and the wall, while simultaneously providing structural integrity for attaching the panel or cladding to the wall.

One aspect of this embodiment of the device is that the adjustable length connecting assembly includes a threaded post connected to the base plate and having a threaded aperture along at least a portion of the threaded post; and a threaded post connected to the panel connecting plate having an threaded outside diameter along at least of a portion of the threaded post that is constructed and arranged to mate with threaded post to provide the adjustable first length. Another aspect of this embodiment of the device is that the device can further comprise an insulation retaining plate having a threaded aperture constructed and arranged to mate with the threaded post so as to be to be disposed between the base plate and the panel connecting plate and constructed and arranged to have its position with respect to the base plate be adjustable so as to provide for a varying second distance between the base plate and the insulation retaining plate to secure the insulation layer between the base plate and the insulation retaining plate.

Another aspect of this embodiment of the device is that the device can further comprising an insulation retaining plate constructed and arranged to be disposed between the base plate and the panel connecting plate and constructed and arranged to have its position with respect to the base plate be adjustable so as to provide a varying second distance between the base plate and the insulation retaining plate so as to secure the insulation layer between the base plate and the insulation retaining plate.

Another embodiment of a device for use in the fastening of a panel or cladding to a back up wall comprises a base plate constructed and arranged to be affixed to the wall, a panel connecting plate constructed and arranged to provide attachment points for fastening of the panel or cladding to the panel connecting plate, an adjustable length connecting assembly that connects the panel connecting plate to the base plate and that is constructed and arranged to be adjustable in a length so as to adjust a position of the panel connecting plate with respect to the base plate so as to provide for a varying first distance between the base plate and the panel connecting plate, and an insulation retaining plate constructed and arranged to be disposed between the base plate and the panel connecting plate and constructed and arranged to have its position be adjustable with respect to the base plate so as to provide for a varying second distance between the base plate and the insulation retaining plate for securing an insulation to the wall.

One aspect of this embodiment of the device is that the adjustable length connecting assembly includes a threaded post connected to the base plate and having a threaded aperture along at least a portion of the threaded post, and a threaded post connected to the panel connecting plate having an threaded outside diameter along at least of a portion of the threaded post that is constructed and arranged to mate with threaded post to provide the adjustable first length.

Another aspect of this embodiment of the device is that the connecting assembly is constructed and arranged so as to provide minimal thermal bridging between the base plate and the panel connecting plate through the insulation layer.

Another aspect of the various embodiments of the device is that the connecting assembly is constructed and arranged to transfer any loads imposed by wind and seismic forces from the panel or cladding to the back up wall.

Another aspect of the various embodiments of the device is that the base plate comprises a metal. Another aspect of this embodiment of the device is that the panel connecting plate comprises a metal. Another aspect of this embodiment of the device is that the insulation retaining plate comprises a metal.

Another aspect of the various embodiments of the device is that the base plate is constructed and arranged with apertures that are constructed and arranged for fasteners to be inserted through the apertures to fasten the base plate to the wall. An alternative aspect of this embodiment of the device is that the base plate is constructed and arranged of materials and a thickness so that it can be welded to the wall.

Another aspect of the various embodiments of the device is that the panel connecting plate can be constructed and arranged so that fasteners can be used to connect the panel or cladding or their fastening assemblies to the panel connecting plate. According to one embodiment, the fasteners can be metal.

Another aspect of the various embodiments of the device is that the device can further be provided with attachment components that are constructed and arranged to be connected to the panel connecting plate. The attachment components can comprise metal or other materials.

In another embodiment, the device comprises a flat base plate that is attached to a first end of a post. This post is inwardly threaded at a second end that is not attached to the base plate. A first end of an outwardly threaded post is engaged to the second end of the inwardly threaded post-type structure by the threading of the outwardly threaded post into the inwardly threaded post. A flat plate is attached to a second end of the outwardly threaded post that is not threaded into the inwardly threaded post. This embodiment also comprises a substantially flat plate that contains a threaded aperture through its middle and that is threaded onto the outwardly threaded post. This plate may or may not have profiles protruding form each face to both secure the plate to both rigid and semi-rigid insulation and to provide structure to rotate the plate in order to thread it up or down on the outwardly threaded post.

One embodiment of a method of affixing a panel or a cladding to a back-up wall, comprises fastening a plurality of base plates to the wall, connecting a panel connecting plate to each of the base plates with a connecting assembly, adjusting a position of the panel connecting plate relative to the base plate with the connecting assembly to provide a desired first distance between the panel connecting plate and the base plate, affixing attachment components to the plurality of panel connection plates, and fastening a panel or cladding to the fastening components.

One aspect of this embodiment of the method is that the method can further comprise adding an insulation layer to the wall after fastening the plurality of base plates to the wall so that the insulation layer covers the plurality of base plates and the wall.

Another aspect of this embodiment of the method is that the method can further comprise securing the insulation layer to the base plate and the wall with an insulation retaining plate connected between the base plate and the panel connecting plate, by positioning the insulation retaining plate a second distance away from the base plate so as to hold the insulation layer in place.

Another aspect of this embodiment of the method is that the method can further comprise affixing continuous attachment components to the panel connection plate with fasteners, affixing clips to the continuous attachment components, and mating the clips affixed to the continuous attachment component to the stiffener plates attached to the panel or cladding.

One aspect of this embodiment of the method is that the plurality of base plates can be attached to the wall by affixing each base plate to the wall with a plurality of fasteners. Another aspect of this embodiment of the method is that the plurality of base plates can be attached to the wall by welding each base plate to the wall.

One aspect of this embodiment of the method is that the panel or cladding can be attached to the plurality of panel connection plates of the plurality of devices of the present invention with a plurality of fasteners. Alternatively the panel or cladding can be attached to the plurality of panel connection plates of the plurality of devices of the present invention by welding the panel or cladding to each panel connection plate.

Still other aspects, embodiments, and advantages of these exemplary aspects and embodiments, are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. The following description of the invention will be better understood with reference to the accompany Figures in which.

DETAILED DESCRIPTION OF THE PREFERRED EMBODIMENTS

Figure 1:
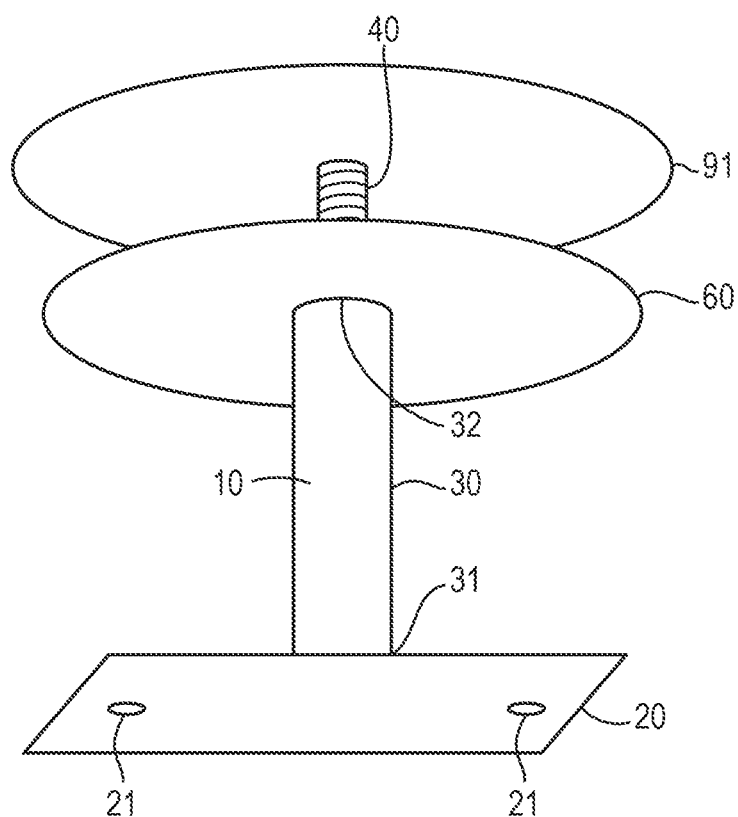
FIG. 1 is a perspective view of one embodiment of the device of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure.

According to aspects of this disclosure, various devices and methods are provided herein for securely fastening cladding systems or panels to back up walls of buildings in a way that substantially reduces thermal bridging. In addition, various devices and methods are provided herein for providing adjustability of a plane of a plate or other type structure for fastening of the cladding systems or panels to such back up walls of buildings. Further, various devices and methods are provided herein for securing varying thickness insulation layers, such as rigid and semi-rigid insulation layers, to the back up wall. By way of introduction and referring to the Figures, Referring to FIG. 1, there is illustrated one embodiment of a device 10 that comprises a flat base plate 20, an inwardly threaded post 30, an outwardly threaded post 40 and a flat panel connecting plate 50. The present invention may or may not also have a flat insulation retaining plate 60 with a threaded aperture that threads onto the outwardly threaded post 40. The base plate 20 has two apertures 21 in it that facilitate the fastening of the base plate 20 to a substrate such as a back up wall with fasteners 23. To the base plate 20 is attached the inwardly threaded post 30 at one end 31 of the inwardly threaded post 30. The other end 32 of the inwardly threaded post 30 receives one end of the outwardly threaded post 40. This connection through the engagement of the threads of the inwardly threaded post 30 and the outwardly threaded post 40 allows for adjustability of the overall length of the device of present invention 10. To the other end of the outwardly threaded post 40 is attached a flat plate 50. Optionally, the flat insulation retaining plate 60 is engaged with the outwardly threaded post 40 via a round threaded aperture 61 that is located substantially in the center of the flat insulation retaining plate 60.

Figure 2:
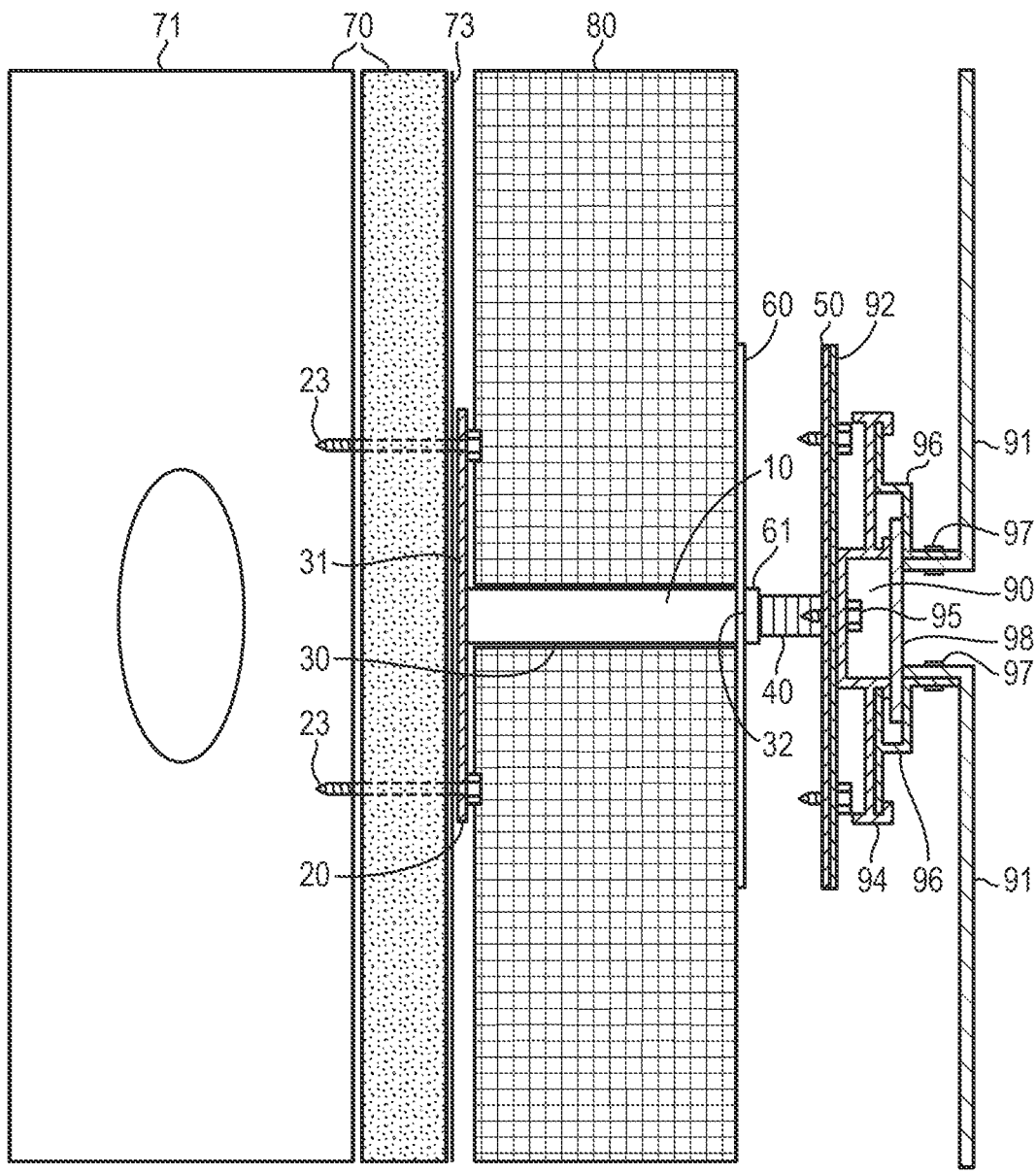
FIG. 2 is a sectional view of one embodiment of the device of the present invention illustrated as operatively engaged in a building enclosure assembly and fastening a composite metal panel veneer to the building at one fastening point, and further illustrating a flat metal strap is used to fasten the composite metal panel veneer to device of the present invention.
Figure 3:
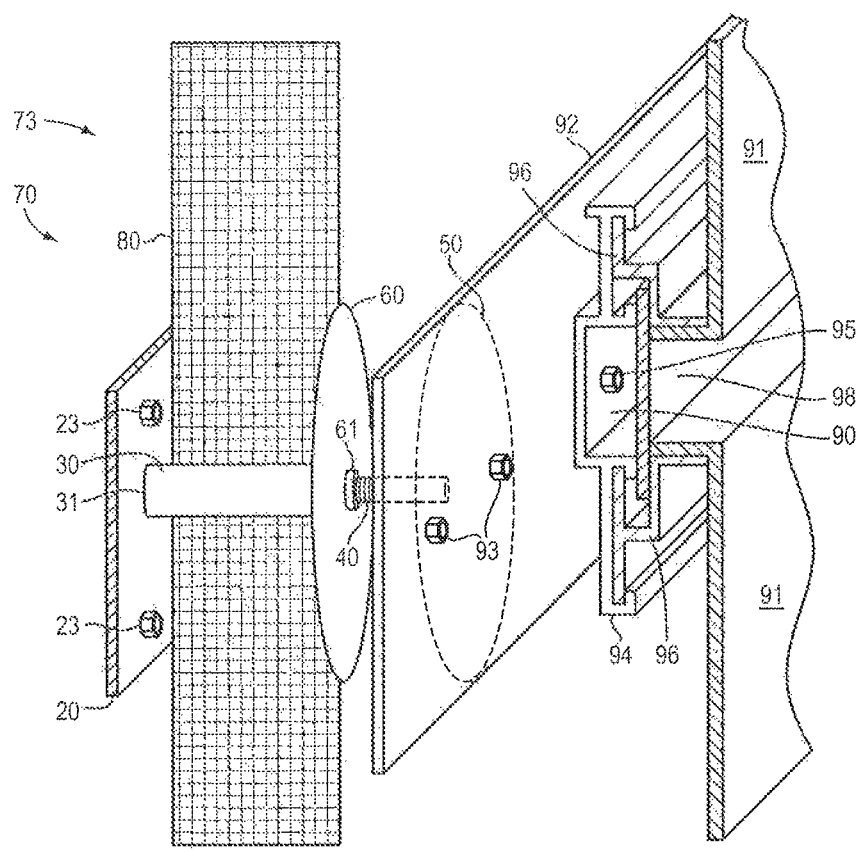
FIG. 3 is a perspective view of one embodiment of the device of the present invention illustrated as operatively engaged in the building enclosure assembly fastening a composite metal panel veneer to the building at one fastening point, and further illustrating a flat metal strap is used as an attachment component to fasten the composite metal panel veneer to device of the present invention.

FIGS. 2 and 3 are sectional and perspective views, respectively, illustrating an embodiment of the device 10 of the invention as intended to be utilized at one fastening point in a building enclosure assembly for fastening a composite metal panel veneer to the building. FIGS. 2 and 3 further illustrate that the base plate 20 is fastened to the back-up wall assembly 70 that, in the illustrated example consists of light gage metal framing 71 and gypsum sheathing 72, via the use of fasteners 23 which are installed through the apertures 21 in the base plate 20 and engaged with the back-up wall 70. In other applications, the back-up wall may consist of wood framing and wood sheathing, concrete masonry units or concrete and that the device of the present invention can be used to securely attach panels or cladding systems to any of such back-up walls. In any of these applications, there may or may not exist water resistant barrier 73 that may serve the function of being an air and vapor barrier for the exterior wall assembly. It is to be appreciated that a plurality of the base plates 20 of the device 10 of the present invention will be installed on the back-up wall assembly 70. The base plates may be, but need not be, installed in a predetermined pattern to the back up wall assembly. After the base plates 20 are installed, an insulation layer 80 is then installed. If the insulation layer 80 is comprised of unitized unit of insulation, the optional flat insulation retaining plate 60 is then threaded onto the threaded post 40 through the aperture 61 in the flat insulation retaining plate 60. If the insulation layer 80 is comprised of, for example a spray polyurethane foam, then the optional flat insulation retaining plate 60 is not needed in the assembly. The outwardly threaded post 40 is then installed into the inwardly threaded post 30 by twisting the threads of each component together similar to how a screw threads into a bolt. The flat panel connecting plate 50 is twisted thus threading the outwardly threaded post 40 into the inwardly threaded post 30 until the face of the flat panel connecting plate 50 is substantially in the desired plane for the attachment of the veneer assembly 90 to the panel connecting plate 50 of the device of the present invention. The flat insulation retaining plate 60 is then threaded down the outwardly threaded post 40 by rotating the flat insulation retaining plate 60 so that the threaded aperture 61 of the flat insulation retaining plate 60 threads down the outwardly threaded post 40 until it comes into contact with the insulation layer 80 thus securing the insulation layer 80 in place via a compression fit. As illustrated in FIGS. 2 and 3, according to aspects of the device, a flat metal strap 92 is used as an attachment component to fasten the composite metal panel veneer system 91 to the panel connecting plate 50 of the device of the present invention.

One embodiment of the veneer assembly 90 as shown in FIGS. 2 and 3 includes a flat metal plate 92 as a connecting component which is fastened either horizontally or vertically to consecutive flat panel connecting plates 50 of the present invention 10 via the use of fasteners 93 which engage both the flat metal plate 92 and the flat panel connecting plate 50 of the device 10 of the present invention. To this flat steel plate 92 may or may not be attached intermittent metal clips 94 which are fastened to the flat metal plate 92 at prescribed spacings via the use of fasteners 95 which engage both the flat metal plate 92 and the intermittent metal clip 94. The veneer assembly may or may not also contain panel stiffener plates 96 that engage with the intermittent clips 94 due to the mating configurations of the two elements. These stiffener plates 96 are mechanically fastened to the metal veneer panels 91 via fasteners 97 at prescribed intervals. The veneer assembly 90 may or may not also contain a strip of metal panel veneer 98 located vertically and/or horizontally between the metal veneer panels 91.

Figure 4:
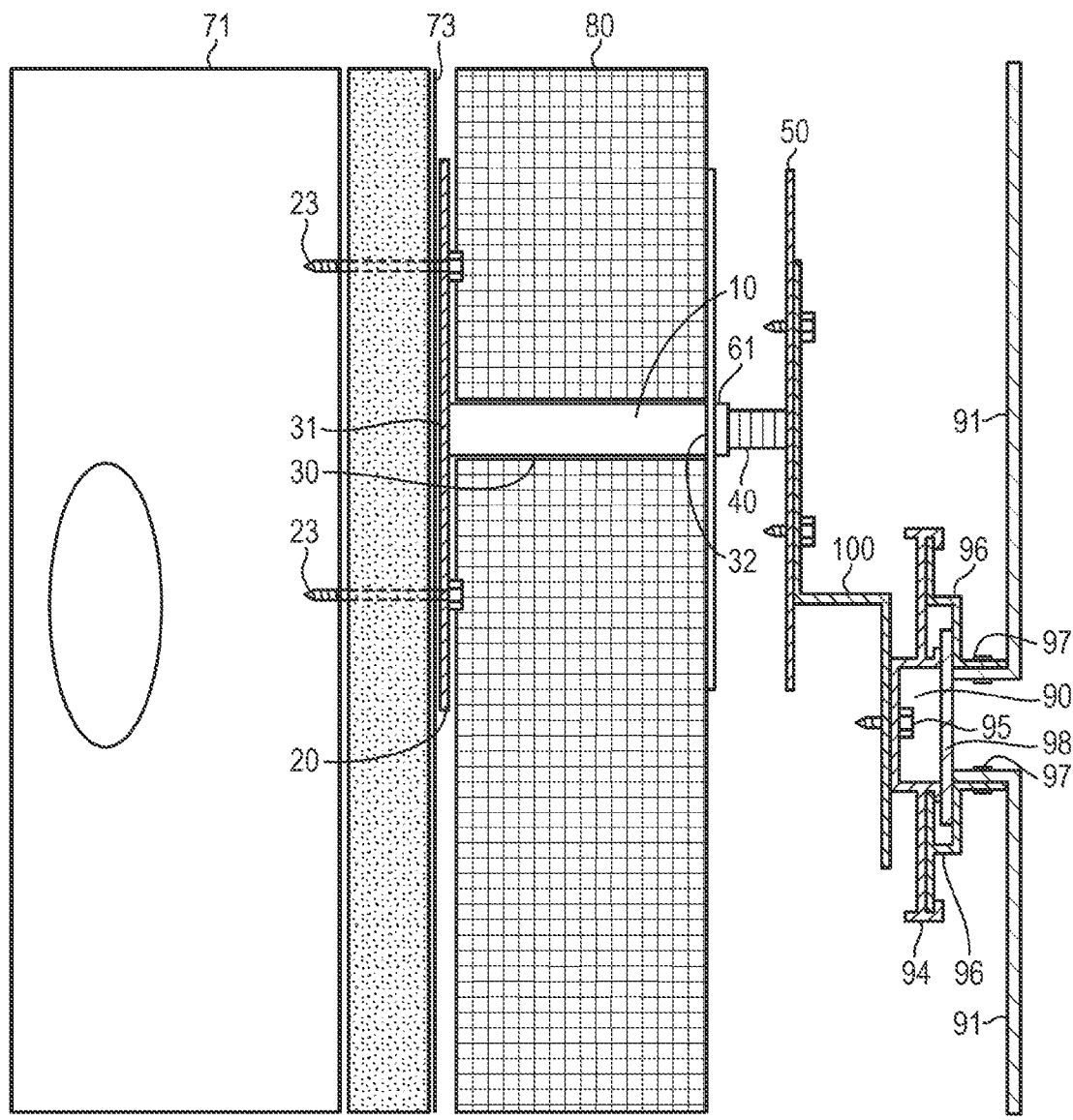
FIG. 4 is a sectional view of one embodiment of the device the present invention illustrated as operatively engaged in the building enclosure assembly fastening a composite metal panel veneer to the building at one fastening point, and further illustrating a metal "Z-furring" is used as an attachment component to fasten the composite metal panel veneer to device of the present invention.

Another embodiment of the veneer assembly 90 as shown in FIG. 4 includes "Z-furring" 100 as a connecting component which is fastened either horizontally or vertically to consecutive flat panel connecting plates 50 of the present invention 10 via the use of fasteners 93 which engage both the "Z-furring" 100 and the flat panel connecting plate 50 of the device 10 of the present invention. To this "Z-furring" may or may not be attached intermittent metal clips 94 which are fastened to the "Z-furring" 100 at prescribed spacings via the use of fasteners 95 which engage both the "Z-furring" 100 and the intermittent metal clip 94. The veneer assembly may or may not also contain panel stiffener plates 96 that engage with the intermittent clips 94 due to the mating configurations of the two elements. These stiffener plates 96 are mechanically fastened to the metal veneer panels 91 via fasteners 97 at prescribed intervals. The veneer assembly 90 may or may not also contain a strip of metal panel veneer 98 located vertically and/or horizontally between the metal veneer panels 91.

Figure 5:
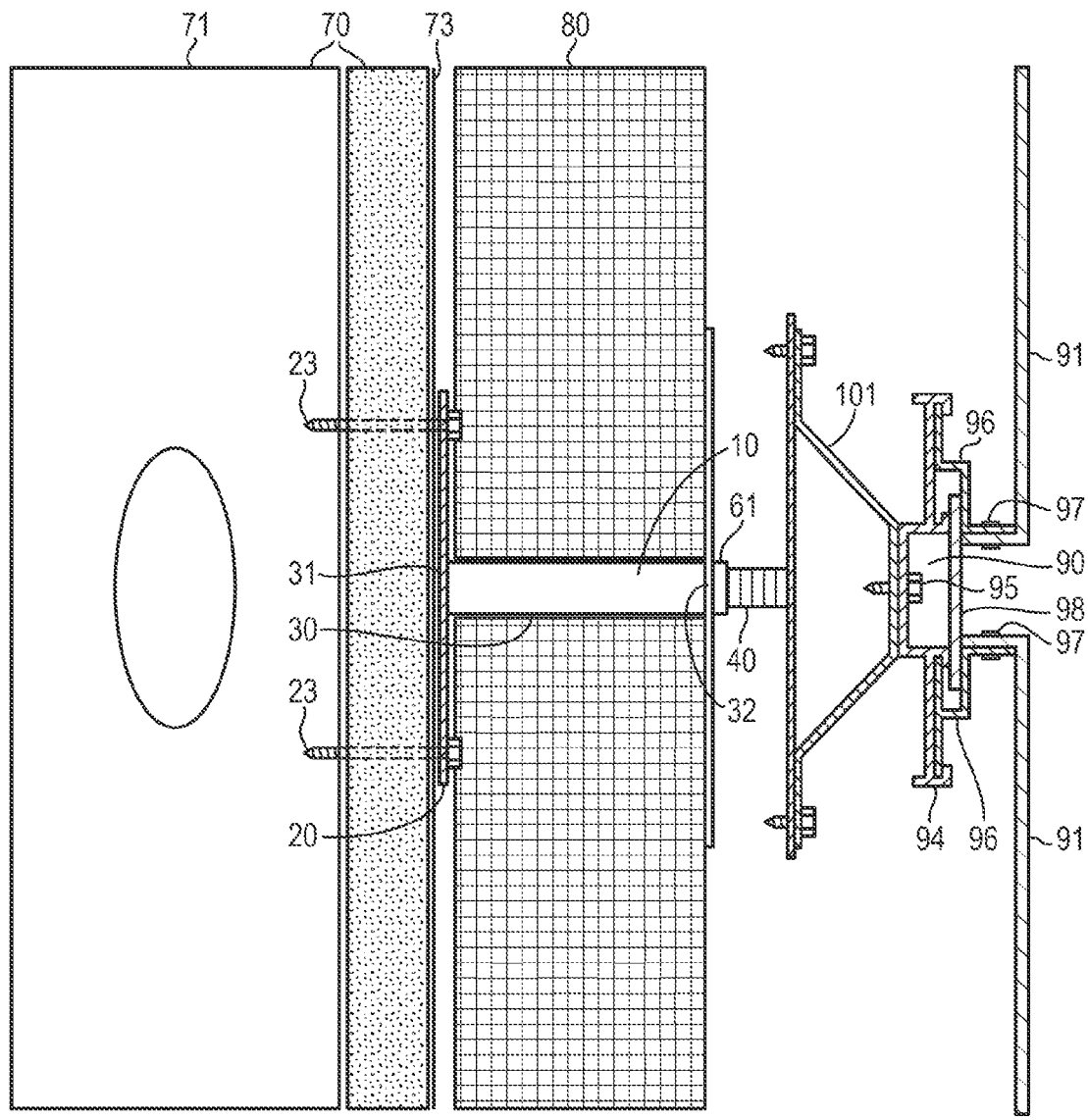
FIG. 5 is a sectional view of one embodiment of the device the present invention illustrated as operatively engaged in the building enclosure assembly fastening a composite metal panel veneer to the building at one fastening point, and further illustrating a metal hat furring is used as an attachment component to fasten the composite metal panel veneer to device of the present invention.

Another embodiment of the veneer assembly 90 as shown in FIG. 5 includes hat furring 101 as a connecting component which is fastened either horizontally or vertically to consecutive flat panel connecting plates 50 of the present invention 10 via the use of fasteners 93 which engage both the hat furring 101 and the flat panel connecting plate 50 of the device 10 of the present invention. To this hat furring 101 may or may not be attached intermittent metal clips 94 which are fastened to the hat furring 101 at prescribed spacings via the use of fasteners 95 which engage both the hat furring 101 and the intermittent metal clip 94. The veneer assembly may or may not also contain panel stiffener plates 96 that engage with the intermittent clips 94 due to the mating configurations of the two elements. These stiffener plates 96 are mechanically fastened to the metal veneer panels 91 via fasteners 97 at prescribed intervals. The veneer assembly 90 may or may not also contain a strip of metal panel veneer 98 located vertically and/or horizontally between the metal veneer panels 91.

Other embodiments of the veneer assembly 90 may include other methods of attachment of the assembly 90 to the present invention without departing from the intent of the invention.

Various modifications may be made to the components of the device 10 of the present invention. Some exemplary modifications to the device are as follows:

The threaded post can be any shape, such as tubular, square, hexagonal, triangular, and the like;

Any of the base plate, the panel connecting plate, and the insulation retaining plate, can be flat, but also need not be. For example, any of the plates can have raised surfaces on one face, the other face or both;

Any of the base plate, the panel connecting plate, and the insulation retaining plate can be made of a metal such as steel, galvanized steel, aluminum, and the like, a metal alloy, such as cast iron, a plastic, such as a PVC, or any other materials that are suitable for its intended purpose; and Other types and configurations of veneer assemblies may be used in conjunction with the device of the present invention.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A device for use in the fastening of a panel or cladding to a back up wall, the device comprising:
   a base plate consisting of a plate with a plurality of apertures for affixing the base plate to an exterior surface of the back up wall and a threaded tube connected to the base plate having a threaded aperture along at least a portion of the threaded tube;
   a panel connecting plate constructed and arranged to provide attachment points for fastening of the panel or cladding to the panel connecting plate, the panel connecting plate including a threaded post connected to the panel connecting plate having a threaded outside diameter along at least of a portion of the threaded post that is constructed and arranged to mate with the threaded tube of the base plate; and
   a connecting assembly that connects the panel connecting plate to the base plate, the connecting assembly including the threaded tube and the threaded post that are constructed and arranged so as to provide structural integrity for attaching the panel connecting plate to the base plate and for attaching the panel or cladding to the back up wall, and that are constructed and arranged to cooperate with the base plate and the panel connecting plate to provide an adjustable first distance between the base plate and the panel connecting plate.

2. The device of claim 1, further comprising an insulation retaining plate disposed between the base plate and the panel connecting plate that is constructed and arranged to cooperate with the connecting assembly to have its position with respect to the base plate be adjustable so as to provide for a varying second distance between the base plate and the insulation retaining plate so as to secure an insulation layer between the base plate and the insulation retaining plate.

3. The device of claim 2, wherein the insulation retaining plate has a threaded aperture constructed and arranged to mate with the threaded post attached to the panel connecting plate so as to be disposed between the base plate and the panel connecting plate and is constructed and arranged to have its position with respect to the base plate be adjustable so as to provide for the varying second distance between the base plate and the insulation retaining plate.

4. The device of claim 1 wherein the connecting assembly is constructed and arranged to transfer any loads imposed by wind and seismic forces from the panel or cladding to the back up wall.

5. A device for use in the fastening of a panel or cladding to a back up wall, the device comprising:
   a base plate constructed and arranged to be affixed only to an exterior surface of the back up wall and to be a load bearing element, the base plate consisting of a plate with a plurality of apertures for affixing the base plate to an exterior surface of the back up wall and a threaded tube connected to the base plate having a threaded aperture along at least a portion of the threaded tube;
   a panel connecting plate constructed and arranged to provide attachment points for fastening of the panel or cladding to the panel connecting plate and to be a load bearing element, the panel connecting plate including a threaded post connected to the panel connecting plate having a threaded outside diameter along at least of a portion of the threaded post that is constructed and arranged to mate with the threaded tube of the base plate; and
   a connecting assembly including the threaded tube and the threaded post that connects the panel connecting plate to the base plate so as to provide at first distance between the base plate and the panel connecting plate so as to provide a load bearing element for attaching the panel or cladding to the panel connecting plate and to the back up wall.

6. The device of claim 5, further comprising an insulation retaining plate constructed and arranged to be disposed between the base plate and the panel connecting plate and constructed and arranged to have its position with respect to the base plate be adjustable so as to provide for a varying second distance between the base plate and the insulation retaining plate so as to secure an insulation layer between the base plate and the insulation retaining plate and without the insulation retaining plate and the insulation being a load bearing element.

7. The device of claim 5, wherein the connecting assembly is constructed and arranged to be adjustable in length so as to provide for different first distances between the base plate and the panel connecting plate so as to compensate for variations in a planar location of the wall.

8. The device of claim 6, wherein the insulation retaining plate has a threaded aperture constructed and arranged to mate with the threaded post.

9. The device of claim 5, wherein the connecting assembly is constructed and arranged so as to provide minimal thermal bridging between the base plate and the panel connecting plate through an insulation layer.

10. A device for use in the fastening of a panel or cladding to a back up wall, the device comprising:
- a base plate constructed and arranged to be affixed only to an exterior surface of the back up wall, the base plate consisting of a plate with a plurality of apertures for affixing the base plate to an exterior surface of the back up wall and a threaded tube connected to the base plate having a threaded aperture along at least a portion of the threaded tube;
- a panel connecting plate constructed and arranged to provide attachment points for fastening of the panel or cladding to the panel connecting plate, the panel connecting plate including a threaded post connected to the panel connecting plate having a threaded outside diameter along at least of a portion of the threaded post that is constructed and arranged to mate with the threaded tube of the base plate; and
- wherein the threaded tube of the base plate and the threaded post of panel connecting plate are configured to mate together to connect the panel connecting plate to the base plate and to provide an adjustable first distance between the base plate and the panel connecting plate so as to provide an adjustable distance from an exterior of the back up wall to the panel connecting plate.

11. The device of claim 10, further comprising an insulation retaining plate having a threaded aperture constructed and arranged to mate with one of the threaded post of the base plate and the threaded post of the panel connecting plate and constructed and arranged to have its position with respect to the base plate be adjustable so as to provide a varying second distance between the base plate and the insulation retaining plate so as to secure the insulation layer between the base plate and the insulation retaining plate.

12. The device of claim 11, wherein the insulation retaining plate has a threaded aperture constructed and arranged to mate with the externally threaded post of the panel connecting plate so as to be to be disposed between the base plate and the panel connecting plate and is constructed and arranged so as to have its position with respect to the base plate be adjustable so as to provide for the varying second distance.

13. The device of claim 10, wherein the threaded tube and the threaded post are constructed and arranged to transfer any loads imposed by wind and seismic forces from the panel or cladding to the back up wall.

14. A device for use in the fastening of a panel or cladding to a back up wall, the device comprising:
- a base plate consisting of an inwardly threaded tube configured to mate with an outwardly threaded post of a panel connecting plate and consisting of a plurality of apertures for affixing the base plate to the back up wall;
- the panel connecting plate having the outwardly threaded post and having a plurality of apertures for fastening of the panel or cladding to the panel connecting plate; and
- wherein the inwardly threaded tube of the base plate and the outwardly threaded post of the panel connecting plate are configured to mate together so as to provide for a varying first distance between the base plate and the panel connecting plate.

15. The device of claim 14, further comprising an insulation retaining plate having an internally threaded aperture configured to mate with the outwardly threaded post of the panel connecting plate so as to be disposed between the base plate and the panel connecting plate and so as to have its position be adjustable with respect to the base plate so as to provide for a varying second distance between the base plate and the insulation retaining plate for securing an insulation to the back up wall.

16. The device of claim 15, wherein the threaded tube and the threaded post are constructed and arranged so as to provide minimal thermal bridging between the base plate and the panel connecting plate through the insulation layer.

17. A method of fastening a panel or cladding to a back up wall comprising:
- securing a base plate consisting of a plate with a plurality of apertures and a threaded tube connected to the base plate having a threaded aperture along at least a portion of the threaded tube to only an exterior surface of the back up wall;
- attaching a panel connecting plate including a threaded post connected to the panel connecting plate having a threaded outside diameter along at least of a portion of the threaded post to the base plate; and
- adjusting a distance between the panel connecting and the base plate from an exterior side of the backup wall by turning the panel connecting plate with respect to the base plate; and
- securing the panel or cladding to the panel connecting plate.

18. The method of fastening a panel or cladding to a back up wall as claimed in claim 17, further comprising adding insulation to the exterior face of the back up wall and attaching an insulation retaining plate to the base plate so that the insulation retaining plate abuts against a face of the insulation and secures the insulation to the back up wall.

19. The method of fastening a panel or cladding to a back up wall as claimed in claim 18, wherein the act of adjusting the distance between the panel connecting and the base plate comprises turning the panel connecting plate with respect to the base plate.

20. The method of fastening a panel or cladding to a back up wall as claimed in claim 19, wherein the act of attaching the insulation retaining plate to the base plate comprises threading the insulation retaining plate onto the externally threaded post of the panel connecting plate.

* * * * *